United States Patent
Fischer

(10) Patent No.: US 8,936,673 B2
(45) Date of Patent: Jan. 20, 2015

(54) SURFACE TREATMENT COMPOSITIONS AND PREPARATION METHODS

(75) Inventor: Gordon Fischer, Paola, KS (US)

(73) Assignee: Central Fiber, LLC, Wellsville, KS (US)

(*) Notice: Subject to any disclaimer, the term of this patent is extended or adjusted under 35 U.S.C. 154(b) by 508 days.

(21) Appl. No.: 13/102,786

(22) Filed: May 6, 2011

(65) Prior Publication Data

US 2012/0282031 A1  Nov. 8, 2012

(51) Int. Cl.
  *C09K 3/22* (2006.01)
  *B09B 1/00* (2006.01)

(52) U.S. Cl.
  CPC . *C09K 3/22* (2013.01); *B09B 1/004* (2013.01); *Y10S 106/90* (2013.01)
  USPC ........................................ 106/205.7; 106/900

(58) Field of Classification Search
  USPC .............................. 106/205.7, 900
  See application file for complete search history.

(56) References Cited

U.S. PATENT DOCUMENTS

| | | | |
|---|---|---|---|
| 3,276,885 A * | 10/1966 | Gandon | 428/403 |
| 3,351,479 A * | 11/1967 | Fairchild | 427/391 |
| 3,917,659 A | 11/1975 | Glancy et al. | |
| 4,041,234 A * | 8/1977 | Maske | 536/114 |
| 4,098,859 A * | 7/1978 | Cummisford et al. | 264/122 |
| 4,363,669 A * | 12/1982 | Cottrell et al. | 106/205.7 |
| 5,112,965 A * | 5/1992 | Fujishige et al. | 536/114 |
| 5,270,459 A * | 12/1993 | Shatzman et al. | 536/114 |
| 5,459,181 A | 10/1995 | West et al. | |
| 5,779,782 A | 7/1998 | Spittle | |
| 5,942,029 A | 8/1999 | Spittle | |
| 6,360,478 B1 | 3/2002 | Spittle | |
| 6,562,882 B2 | 5/2003 | Harrison | |
| 7,484,330 B2 | 2/2009 | Lougheed | |
| 7,681,353 B2 | 3/2010 | Lougheed | |
| 7,947,766 B2 * | 5/2011 | Heinzman et al. | 524/47 |
| 2005/0245678 A1 | 11/2005 | Marsden | |

FOREIGN PATENT DOCUMENTS

WO  2004094081 A2  11/2004

OTHER PUBLICATIONS

Free Online Dictionary, "blend", retrieved Apr. 4, 2014, 4 pages.*
Office Depot, "Office Depot Kraft Envelopes, 10"x13", 250" retrieved Apr. 4, 2014, 4 pages.*
Whipple, "The Structure of Glyoxal in Water", Journal of the American Chemical Society pp. 7183-7186. (Dec. 1970).*

* cited by examiner

*Primary Examiner* — David M Brunsman
(74) *Attorney, Agent, or Firm* — Hovey Williams LLP

(57) ABSTRACT

A surface treatment composition comprising a crosslinking agent which comprises a plurality of dialdehyde residues, a water soluble polymer such as guar gum capable of covalently bonding with the crosslinking agent and a fibrous material.

22 Claims, No Drawings

SURFACE TREATMENT COMPOSITIONS AND PREPARATION METHODS

BACKGROUND

1. Field of the Invention

Various embodiments of the present invention relate to surface treatments for application to a variety of surfaces, such as soil, mining overburden and tailings piles, landfills, and the like. More particularly, embodiments described herein relate to chemically bonded surface treatments.

2. Description of the Related Art

Surface treatments are commonly used for a variety of purposes. For example, many different types of fiber matrices have been applied to soil surfaces for erosion control, to construction sites for dust control, or to control dust emissions from coal piles, mining overburden piles, and dry tailings impoundments. Prevention of erosion is also important in many construction projects, as is control of detrimental impacts on offsite water quality resulting from contaminated surface runoff. Surface treatments may also be important in controlling erosion after wildfire damage, which may assist in the protection of watershed, reservoirs, and soil failure. Although advances have been achieved in the art of such surface treatments, improvements are still needed.

SUMMARY

One embodiment of the present invention concerns a surface treatment composition. The composition of this embodiment comprises: (a) a solid cross-linking agent comprising a plurality of residues of a dialdehyde; and (b) a water-soluble polymer capable of covalently bonding with the solid cross-linking agent.

Another embodiment of the present invention concerns a surface treatment method comprising: (a) combining water and a surface treatment composition to thereby form an aqueous surface treatment mixture, where the surface treatment composition comprises (i) a solid cross-linking agent comprising a plurality of residues of a dialdehyde, and (ii) a water-soluble polymer capable of covalently bonding with the solid cross-linking agent; and (b) applying at least a portion of the aqueous surface treatment mixture to a target area.

Yet another embodiment of the present invention concerns a method of making a surface treatment composition. The method of this embodiment comprises: (a) heating a mixture comprising water and a dialdehyde to remove at least a portion of the water thereby forming a solid cross-linking agent; and (b) combining at least a portion of the solid cross-linking agent with a water-soluble polymer capable of covalently bonding with the solid cross-linking agent.

DETAILED DESCRIPTION

Various embodiments of the present invention concern a surface treatment composition comprising a solid cross-linking agent and a water-soluble polymer capable of covalently bonding with the solid cross-linking agent. Such surface treatment compositions can further comprise one or more fibrous materials. The surface treatment compositions described herein can be applied to a variety of surfaces to achieve various effects, such as erosion or dust control.

As noted above, the surface treatment compositions described herein can comprise a solid cross-linking agent. As used herein, the term "solid" when referring to the cross-linking agent denotes a composition having a state of matter that is primarily in solid form. As used herein, the term "primarily" shall mean greater than 50 percent. Thus, the "solid" cross-linking agent can include a minor liquid component in certain embodiments. Additionally, the term "solid" is intended to include both crystalline and amorphous (e.g., oligomeric or polymeric) solid materials. The solid and liquid concentrations of the various components described herein shall be determined at a temperature of 22° C. and a pressure of 1 atm.

In one or more embodiments, the solid cross-linking agent can have a solid content of at least 55, at least 60, at least 65, at least 70, at least 75, at least 80, at least 85, at least 90, at least 95, or at least 99 weight percent based on the entire weight of the solid cross-linking agent. In still other embodiments, the solid cross-linking agent can be completely or substantially completely solid. Consequently, in one or more embodiments, the solid cross-linking agent can include a minor liquid component of less than 50, less than 45, less than 40, less than 35, less than 30, less than 25, less than 20, less than 15, less than 10, less than 5, or less than 1 weight percent based on the entire weight of the solid cross-linking agent. Furthermore, in various embodiments the solid cross-linking agent can contain no or substantially no liquid. In still other embodiments, the solid cross-linking agent can have a volatile component of less than 20, less than 15, less than 12, less than 10, less than 5, or less than 1 weight percent based on the entire weight of the solid cross-linking agent. As used herein, the term "volatile" is intended to denote a component that vaporizes at a temperature of 125° C. or less at a pressure of 1 atm in dry air. In various embodiments, the solid cross-linking agent comprises unbound water in an amount of less than 20, less than 15, less than 10, less than 5, or less than 1 weight percent based on the entire weight of the solid cross-linking agent. As used herein, the term "unbound water" is intended to denote water molecules that have not reacted into the solid cross-linking agent. As noted above, the solid and liquid content of the solid cross-linking agent is determined at 22° C. and 1 atm. In various embodiments, the solid cross-linking agent can have any of the above-described solid, liquid, volatile, and water contents at temperatures up to 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., or 125° C.

In various embodiments, the solid cross-linking agent can have a softening point of at least 30° C., at least 45° C., or at least 60° C. The softening point of the cross-linking agent can be determined by observance of flow of the material when heated on a hot surface under an optical microscope. In further embodiments, the solid cross-linking agent can have a softening point in the range of from about 30 to about 90° C., in the range of from about 45 to about 90° C., or in the range of from 60 to 90° C.

In one or more embodiments, the solid cross-linking agent can comprise a plurality of dialdehyde residues. As used herein, the term "residue" shall denote a major portion of a molecule which is covalently linked to another molecule, as is well accepted in the art. Such other molecule may be of the same or different type as the subject molecular residue; however, the term "residue" in describing the dialdehyde residues herein is not intended to include hydrates of a single dialdehyde molecule. In other words, the reaction product between a single dialdehyde and one or more water molecules (such as may be found in an aqueous solution of a dialdehyde) shall not be considered a "residue" of a dialdehyde, as that term is used herein.

Dialdehydes suitable for use as the precursor to such dialdehyde residues can be any dialdehyde known or hereafter discovered in the art. In various embodiments, the precursor dialdehydes suitable for use can have the following structure:

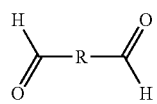

formula (I)

where R of formula (I) can be any straight or branched, substituted or unsubstituted, saturated or unsaturated alkylene or arylene group having a carbon number of from 0 to 20, and may include heteroatoms. As used herein, the term "alkylene" shall denote a divalent group formed by removing two hydrogen atoms from a hydrocarbon, the free valencies of which are not engaged in a double bond, and may include heteroatoms. As used herein, the term "arylene" shall denote a divalent group formed by removing two hydrogen atoms from a ring carbon in an arene (i.e., a mono- or polycyclic aromatic hydrocarbon), and may include heteroatoms. It should be noted that when R has a "0" carbon number, then such alkylene or arylene group is not actually present, and the corresponding adjacent carbon atoms would be directly bonded to each other. In one or more embodiments, R can be a straight-chain $C_0$ to $C_{1-2}$ alkylene group. Additionally, R can be a saturated, unsubstituted, straight-chain $C_0$ to $C_9$ alkylene group. In still other embodiments, R can be a saturated, unsubstituted, straight-chain $C_0$ to $C_3$ alkylene group. It should be noted that regardless of the composition and configuration of the R group, the adjacent carbon atoms shown in formula (I) can be bonded to any terminal or non-terminal carbon atom present therein. In one or more embodiments, the adjacent carbon atoms can be bonded to corresponding terminal carbon atoms of the R group. As used herein, when a range is provided for a number of carbon atoms in an alkylene or arylene group, such range shall be construed as disclosing and providing support not only for the end-points of such range, but also for all intermediate values of carbon atoms included therein. For instance, the range of $C_0$ to $C_3$ shall be deemed as disclosing and providing support for $C_0$, $C_1$, $C_2$, and $C_3$ individually.

Specific examples of dialdehydes suitable for use as the precursors of dialdehyde residues in the solid cross-linking agent include, but are not limited to, glyoxal, malondialdehyde, succindialdehyde, and glutaraldehyde. In one or more embodiments, the solid cross-linking agent can comprise residues of dialdehydes selected from the group consisting of glyoxal, malondialdehyde, succindialdehyde, glutaraldehyde, and mixtures of two or more thereof. In further embodiments, the solid cross-linking agent can comprise residues of two different types of dialdehydes. For example, in various embodiments, the solid cross-linking agent comprises residues of glyoxal and glutaraldehyde. In one or more embodiments, the solid cross-linking agent comprises residues of glyoxal.

In one or more embodiments, the solid cross-linking agent can comprise the dialdehyde residues in the form of oligomers of a single or mixed dialdehyde. As used herein, the term "oligomer" as it relates to dialdehydes shall denote a molecule comprising the residues of at least two dialdehyde molecules. For example, dimers and trimers of single or mixed dialdehydes shall be considered "oligomers," as well as higher order combinations and/or hydrates thereof. In various embodiments, the solid cross-linking agent can comprise oligomers of any one or combination of one or more of the above-described dialdehydes. In certain embodiments, the solid cross-linking agent can comprise oligomers of a single type of dialdehyde. Additionally, in one or more embodiments, the solid cross-linking agent can comprise glyoxal oligomers. Dialdehyde oligomers suitable for use herein can have a weight average molecular weight of at least 80, at least 90, at least 100, at least 110, at least 120, at least 130, or at least 134 g/mol.

In still other embodiments, the dialdehyde residues can be present as a reaction product between a dialdehyde and another non-dialdehyde component. Examples of suitable non-dialdehyde components for use in the solid cross-linking agent include, but are not limited to, urea, biurea, amides, amines, alcohols, carboxylic acids, and mixtures of two or more thereof. In various embodiments, the solid cross-linking agent comprises residues of a dialdehyde and urea. In further embodiments, the solid cross-linking agent comprises residues of glyoxal and urea. In certain embodiments, the solid cross-linking agent comprises no urea.

In various embodiments, the solid cross-linking agent can comprise dialdehyde residues in any of the above-described forms (e.g., oligomers) in an amount of at least 10, at least 20, at least 30, at least 40, at least 50, at least 60, at least 70, at least 80, at least 90, at least 95, at least 99, or 100 weight percent, based on the entire weight of the solid cross-linking agent. In other embodiments, the solid cross-linking agent can further comprise free dialdehydes and/or free dialdehyde hydrates with the dialdehyde residues in the solid cross-linking agent. In these embodiments, the solid cross-linking agent can comprise free dialdehydes, free dialdehyde hydrates, and dialdehyde residues in a combined concentration of at least 10, at least 20, at least 30, at least 40, at least 50, at least 60, at least 70, at least 80, at least 90, at least 95, at least 99, or 100 weight percent, based on the entire weight of the solid cross-linking agent. As used herein, the term "free" when referring to dialdehydes or dialdehyde hydrates is intended to denote a dialdehyde in its unreacted state (in the case of free dialdehydes) or only reacted with one or more water molecules (in the case of free dialdehyde hydrates). As used herein, the term "dialdehyde hydrate" is intended to denote the reaction product of a dialdehyde with water. In various embodiments, the dialdehyde hydrate can be the reaction product of a dialdehyde molecule with two water molecules. Free dialdehydes suitable for use herein can be any of those dialdehydes described above as suited for use as the precursors to the dialdehyde residues of the solid cross-linking agent. Free dialdehyde hydrates suitable for use herein can be the reaction product of water and any of those dialdehydes described above as suited for use as the precursors to the dialdehyde residues of the solid cross-linking agent. When free dialdehydes and/or free dialdehyde hydrates are simultaneously present with the dialdehyde residues in the solid cross-linking agent, the free dialdehyde and/or free dialdehyde hydrate content can be less than 50, less than 40, less than 30, less than 20, less than 10, less than 5, or less than 1 weight percent based on the combined weight of the free dialdehydes, free dialdehyde hydrates, and dialdehyde residues. Additionally, the free dialdehyde and/or free dialdehyde hydrate content can be the in range of from greater than 0 to less than 50 weight percent, greater than 0 to less than 40 weight percent, greater than 0 to less than 30 weight percent, greater than 0 to less than 20 weight percent, greater than 0 to less than 10 weight percent, greater than 0 to less than 5 weight percent, or greater than 0 to less than 1 weight percent based on the combined weight of the free dialdehydes, free dialdehyde hydrates, and dialdehyde residues.

The physical form of the solid cross-linking agent is not particularly limited. In various embodiments, the solid crosslinking agent can be in the form of a particulate matter, including, but not limited to, powder, granules, pellets, or mixtures of two or more thereof.

The solid cross-linking agents suitable for use herein can be prepared employing any known or hereafter discovered methods in the art. In various embodiments, the solid cross-linking agent can be prepared by heating an initial mixture (e.g., solution) comprising water, one or more dialdehydes, and optionally one or more of the above-described non-dialdehyde components (e.g., urea) at a temperature sufficient to cause at least a portion of the water to evaporate. As used herein, the term "mixture" shall denote a system comprising at least two different components, and shall include, but not be limited to, suspensions, emulsions, solutions, and colloids. In various embodiments, the initial mixture can be an aqueous mixture containing one or more dialdehydes at a concentration of at least 5, at least 10, at least 15, at least 20, at least 25, at least 30, at least 35, or at least 40 weight percent based on the entire weight of the mixture. When a non-dialdehyde component is also employed as described above, the initial mixture can be an aqueous mixture containing a combined concentration of dialdehyde and non-dialdehyde components of at least 5, at least 10, at least 15, at least 20, at least 25, at least 30, at least 35, or at least 40 weight percent based on the entire weight of the mixture. In various embodiments, the initial mixture can comprise water and at least two types of dialdehydes. In one or more embodiments, the initial mixture comprises water and a single dialdehyde selected from the group consisting of glyoxal, malondialdehyde, succindialdehyde, and glutaraldehyde. In further embodiments, the initial mixture consists of or consists essentially of water and glyoxal.

As noted above, the initial mixture can be heated to cause at least a portion of the water therein to evaporate. Though not wishing to be bound by theory, it is believed that this evaporation process causes the dialdehyde contained therein to at least partially oligomerize with itself, water, and/or other components present in the mixture. A variety of techniques can be employed to heat and evaporate at least a portion of the water in the initial mixture. Such techniques include, but are not limited to, pan drying, spray drying, drum drying, contact drying, media slurry drying, and combinations of two or more thereof. Such drying techniques can be performed at ambient pressure or under vacuum.

In various embodiments, the initial mixture can be heated at a temperature of at least 30° C., at least 45° C., or at least 60° C. Furthermore, the initial mixture can be heated at a temperature in the range of from about 30 to about 90° C., in the range of from about 45 to about 90° C., or in the range of from 60 to 90° C. In one or more embodiments, the initial mixture can be heated under time and temperature conditions sufficient to evaporate at least 10, at least 20, at least 30, at least 40, at least 50, at least 60, at least 70, at least 80, at least 90, at least 95, or at least 99 weight percent of the unbound water in the initial mixture. Depending on the technique employed, the initial mixture can be heated for a time period of at least 30 minutes, at least 1 hour, at least 6 hours, at least 12 hours, or at least 24 hours. Additionally, the initial mixture can be heated for a time period in the range of from about 30 minutes to about 2 weeks, in the range of from about 1 hour to about 1 week, or in the range of from 6 to 48 hours. In alternate embodiments, such as when a spray drying technique is employed, the heating period can be a manner of seconds. Thus, in various embodiments, the heating period can range from about 0.1 to about 300 seconds, from about 0.5 to about 120 seconds, or from 1 to 30 seconds.

Following formation according to the above-described procedure, the resulting solid cross-linking agent can be cooled down (e.g., to room temperature) and further processed in any manner known or hereafter discovered in the art to render it suitable for use in the herein-described surface treatment compositions. For instance, the resulting solid cross-linking agent can be pelletized, pulverized, or otherwise particulated or granulated to render it suitable for combination with additional components of the surface treatment compositions, described below. Such processes can be facilitated with or without the use of various processing aids known or hereafter discovered in the art. For example, grinding aids and/or anti-clumping aids (e.g. anti-caking aids) may be employed during such processes. Examples of such processing aids include, but are not limited to, waxes, such as stearic acid, calcium stearate, calcium laurate, lauric acid, and petroleum waxes; and minerals, such as calcium carbonate, clay, silica, fumed silica, and the like.

As noted above, the surface treatment compositions described herein can further comprise a water-soluble polymer. As used herein, the term "water-soluble" shall denote a solubility level of at least 1 gram per liter of deionized water at 25° C. In various embodiments, the water-soluble polymer can have a solubility of at least 2, at least 3, at least 4, at least 5, at least 6, at least 7, at least 8, at least 9, or at least 10 grams per liter of deionized water at 25° C. In various embodiments, the selected water-soluble polymer can have a 1.0 weight percent Brookfield viscosity at 25° C. of at least 250, at least 1,000, or at least 2,000 centipoise. In further embodiments, the water-soluble polymer can have a 1.0 weight percent Brookfield viscosity at 25° C. in the range of from about 250 to about 10,000 centipoise, or in the range of from 2,000 to 6,000 centipoise. In certain embodiments, the water-soluble polymer can be non-toxic. Additionally, in various embodiments, the water-soluble polymer can be biodegradable.

In one or more embodiments, the water-soluble polymer can comprise a plurality of pendant functional groups capable of covalently bonding with the above-described solid cross-linking agent. In various embodiments, the water-soluble polymer can comprise an average of at least 2 of such pendant functional groups per polymer chain of the water-soluble polymer. In still other embodiments, the water-soluble polymer can comprise an average of at least 0.1, at least 0.5, at least 1, or at least 2 of such pendant functional groups per monomer residue of the water-soluble polymer. Any functional groups capable of covalently bonding with an aldehyde group or residue of an aldehyde group can be employed in the various embodiments described herein. Suitable functional groups capable of covalently bonding with the above-described solid cross-linking agent include, but are not limited to, hydroxyl groups, amide groups, amine groups, carboxyl groups, and mixtures of two or more thereof. In one or more embodiments, the water-soluble polymer can comprise hydroxyl pendant functional groups. In such embodiments, at least a portion of the hydroxyl groups present in the water-soluble polymer can be primary hydroxyl groups. In certain embodiments, at least 10, at least 20, or at least 30 mole percent of the hydroxyl groups present on the water-soluble polymer can be primary hydroxyl groups.

Suitable examples of water-soluble polymers include, but are not limited to, polysaccharides, polyacrylamides, proteins derived from a natural source (e.g., soybean), and mixtures of two or more thereof. In various embodiments, the water-soluble polymer comprises a polysaccharide. Additionally, the water-soluble polymer can be selected from the group consisting of guar gum, corn starch, potato starch, and mixtures of two or more thereof. In various embodiments, the water-soluble polymer comprises guar gum.

The physical form of the water-soluble polymer is not particularly limited and can be any form that lends itself to combination and mixture in the surface treatment compositions described herein. In various embodiments, the water-soluble polymer can be in a particulate solid form, such as pellets, granules, powder, and the like.

As noted above, the surface treatment compositions described herein can further comprise a fibrous material. Any fibrous materials known or hereafter discovered in the art may be employed in the embodiments described herein. In various embodiments, the fibrous material can optionally comprise a plurality of pendant functional groups capable of covalently bonding with the solid cross-linking agent. Suitable pendant functional groups for the fibrous material can be any of those described above with respect to the pendant functional groups of the water-soluble polymer.

In various embodiments, the fibrous material can comprise a plurality of natural and/or synthetic fibers. In one or more embodiments, the fibrous material comprises a plurality of natural fibers, which can be cellulosic fibers. Examples of suitable cellulose fibers include, but are not limited to, wood fiber, paper fiber, straw, corn stover, hemp, flax, kenaf, sorghum, coir, cotton gin-generated fiber, opened cotton fabric, and combinations of two or more thereof. In various embodiments, the fibrous material can be selected from the group consisting of wood fiber, paper fiber, straw, corn stover, and mixtures of two or more thereof. In further embodiments, the fibrous material can be selected from the group consisting of wood fiber, paper fiber, and mixtures thereof. An example of a suitable commercially available wood fibrous material includes, but is not limited to, SECOND NATURE® wood mulch, available from Central Fiber LLC of Wellsville, Kans. An example of a suitable paper fibrous material includes, but is not limited to, SECOND NATURE® paper mulch, available from Central Fiber LLC of Wellsville, Kans.

Synthetic fibers suitable for use herein can be prepared from a variety of synthetic polymers including, but not limited to, polyolefins, polyesters, polyamides, polyimides, polyacrylates, polylactones, polylactams, and mixtures of two or more thereof. Synthetic fibers suitable for use herein can have an average length in the range of from about 0.1 to about 5 cm, in the range of from about 0.5 to about 2.5 cm, or in the range of from about 1 to 2.5 cm. Additionally, the synthetic fibers can have an average diameter in the range of from about 0.01 to about 1 mm. When a combination of synthetic and cellulosic fibers is employed, the fibrous material can comprise the synthetic fibers in a concentration in the range of from greater than 0 to about 50 weight percent, in the range of from about 5 to about 20 weight percent, or in the range of from 5 to 10 weight percent based on the entire weight of the fibrous material.

The above-described components (i.e., the solid cross-linking agent, the water-soluble polymer, and the fibrous material) can be combined to form the above-mentioned surface treatment compositions. Any methods known or hereafter discovered in the art for combining the above-described components may be employed. In one or more embodiments, the components can be dry blended using, for example, an industrial mixer or agitator. Additionally, such preparation method can be a continuous process. In various embodiments, the resulting mixture can be a surface treatment composition primarily containing solid components. Furthermore, the surface treatment composition can have a total solids content of at least 55, at least 60, at least 65, at least 70, at least 75, at least 80, at least 85, at least 90, at least 95, at least 99, or 100 weight percent based on the entire weight of the surface treatment composition.

In various embodiments, the above-described fibrous material can be present in the surface treatment composition at a concentration in the range of from greater than 0 to about 99.9 weight percent, in the range of from about 50 to about 99 weight percent, in the range of from about 80 to about 95 weight percent, or in the range of from 85 to 90 weight percent based on the entire weight of the surface treatment composition. Additionally, the above-described water-soluble polymer can be present in the surface treatment composition at a concentration in the range of from about 1 to about 40 weight percent, in the range of from about 2 to about 30 weight percent, in the range of from about 3 to about 20 weight percent, or in the range of from 5 to 10 weight percent based on the entire weight of the surface treatment composition. Furthermore, the above-described solid cross-linking agent can be present in the surface treatment composition at a concentration in the range of from about 0.1 to about 50 weight percent, in the range of from about 0.1 to about 20 weight percent, in the range of from about 0.5 to about 10 weight percent, or in the range of from 1 to 5 weight percent based on the entire weight of the surface treatment composition. In various embodiments, the water-soluble polymer and the solid cross-linking agent can be present in the surface treatment composition at a weight ratio in the range of from about 99:1 to about 25:75, in the range of from about 95:5 to about 75:25, or in the range of from 90:10 to 80:20 water-soluble polymer-to-solid cross-linking agent.

In various embodiments, the surface treatment composition can comprise a variety of additional components, which may depend on the desired end use of the surface treatment composition. For example, the surface treatment composition can comprise one or more additives selected from the group consisting of seed (e.g., grass seed), fertilizers, soil stabilizers, soil fortifiers, colorants, clays, catalysts, crusting agents, thickening agents, surfactants, flocculating agents, and mixtures of two or more thereof. In various embodiments, the surface treatment composition can comprise bentonite clay (a thickening agent) in an amount ranging from greater than 0 to about 10 weight percent, based on the total weight of the surface treatment composition. Additionally, in certain embodiments, the surface treatment composition can comprise ammonium sulfate (a latent acid catalyst) in an amount ranging from greater than 0 to about 2 weight percent, based on the total weight of the surface treatment composition. Additional latent acids, such as amine/acid salts, may also be used alone or in combination with ammonium sulfate. In further embodiments, the surface treatment composition can comprise plaster (a crusting agent) in an amount ranging from greater than 0 to about 25 weight percent, based on the total weight of the surface treatment composition. In additional embodiments, the surface treatment composition can comprise polyacrylamide (a thickening agent) in an amount ranging from greater than 0 to about 2 weight percent, based on the total weight of the surface treatment composition. In still other embodiments, the surface treatment composition can comprise a surfactant in an amount ranging from greater than 0 to about 5 weight percent, based on the total weight of the surface treatment composition. In yet further embodiments, the surface treatment composition can comprise a colorant in an amount ranging from greater than 0 to about 5 weight percent, based on the total weight of the surface treatment composition. Furthermore, the surface treatment composition can comprise a soil flocculating agent (e.g., an anionic or cationic polymer or salt, such as soy proteins, calcium chloride, anionic and/or cationic polyacrylamide, and the like) in an amount ranging from greater than 0 to about 5 weight percent, based on the total weight of the surface treatment composition.

As noted above, the surface treatment compositions described herein can be employed in a variety of circumstances. In various embodiments, the above-described surface treatment composition can be dispersed in water to form an aqueous surface treatment mixture. In such embodiments, the surface treatment composition can be combined with water at a rate in the range of from about 50 to about 200 gallons of water per 50 pounds of surface treatment composition, in the range of from about 75 to about 150 gallons of water per 50 pounds of surface treatment composition, in the range of from about 90 to about 125 gallons of water per 50 pounds of surface treatment composition, or in the range of from 100 to about 120 gallons of water per 50 pounds of surface treatment composition. The surface treatment composition can be combined and mixed with the water employing any suitable means known or hereafter discovered in the art. In various embodiments, the resulting mixture can be homogenous or substantially homogenous.

Following dispersion in water, the resulting aqueous surface treatment mixture can be applied to a target area. Any methods known or hereafter discovered in the art can be employed for applying the aqueous surface treatment mixture. In various embodiments, the aqueous surface treatment mixture can be sprayed onto a target area in a manner similar to applying a hydraulic mulch or hydroseeding. In various embodiments, the aqueous surface treatment mixture can be applied to the target area at a rate in the range of from about 100 to about 5,000 pounds per acre, in the range of from about 1,000 to about 4,500 pounds per acre, or in the range of from 2,000 to 4,000 pounds per acre, based on the dry weight of the surface treatment composition (i.e., prior to combination with water).

The target area to be treated can include a wide variety of surfaces. For example, the target area to be treated can include any surface where erosion control or dust control is desired. Such surfaces include, but are not limited to, soil surfaces, mined ore (e.g., coal) piles, mining overburden piles, and dry tailings impoundments. The target area may also include surfaces in need of barrier protection against odor release and vermin resistance, such as a landfill.

After the aqueous surface treatment mixture has been applied, it can be allowed to dry for a period of time. Though not wishing to be bound by theory, it is believed that during this drying time the above-described solid cross-linking agent and water-soluble polymer undergo chemical reactions to covalently bond, thereby forming a matrix which binds the fibrous material together. In one or more embodiments, such as when the fibrous material contains substituent groups that are reactive with the cross-linking agent, the fibrous material may also covalently bond with the cross-linking agent. In various embodiments, the applied aqueous surface treatment mixture can be allowed to dry at ambient conditions for a period of time of at least 30 minutes, at least 1 hour, at least 6 hours, at least 12 hours, at least 24 hours, or at least 48 hours before rewetting (e.g., by rain).

In various embodiments, the resulting dried surface treatment mixture can prevent soil erosion, according to the test procedure described below in Example 3, of at least 80 percent, at least 85 percent, at least 90 percent, at least 95 percent, at least 99 percent, at least 99.99 percent, or at least 99.999 percent when applied at a rate of 3,500 pounds per acre using an aqueous surface treatment mixture having a concentration of 100 gallons of water per 50 lbs of surface treatment composition.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

Tensile Strength Analysis

Nine samples (Sample Nos. 1-9) were prepared using the component concentrations indicated in Table 1, below. The wood fiber type employed for each of these samples was SECOND NATURE® wood mulch obtained from Central Fiber LLC of Wellsville, Kans. The paper fiber employed in each of these samples was SECOND NATURE® paper mulch obtained from Central Fiber LLC of Wellsville, Kans. The flax component employed was obtained from Biofibre Industries, Inc., of Saskatchewan, Canada. The kenaf component employed had fiber lengths ranging from 25 mm to 80 mm and was obtained from Bast Fibers LLC of Cresskill, N.J. The polypropylene microfiber employed was Grace MicroFiber having fiber lengths between ½ and ¾ of an inch and a maximum of 3 denier obtained from W. R. Grace of Columbia, Md. The guar gum employed in each of the samples below was obtained from MG Ingredients of Brandon, Fla.

The solid glyoxal component employed in Sample No. 3 was glyoxal trimer dihydrate (product no. 50655), purchased from Sigma Aldrich of St. Louis, Mo. The solid glyoxal component in Sample Nos. 4 and 5 were prepared by oven-drying a 40% glyoxal solution at 45° C. for 48 hours. Thereafter, the resulting material was allowed to cool to room temperature and then ground to a fine powder in a coffee bean grinder. The solid glyoxal component in Sample Nos. 7 through 9 was prepared by Howard Industries of Columbus, Ohio, by heating a 40% glyoxal solution under vacuum in a commercial crystallizer.

The solid urea/glyoxal component of Sample 6 was prepared by mixing 596.8 g of a 40% glyoxal solution and 111.1 g of technical grade urea for 15 minutes at 45° C. The resulting mixture was then cooled to 25° C. and passed into an Anhydro Laboratory rotary spray dryer spinning at 30,000 rpm with an inlet temp of 155° C. and an outlet temp of 65° C. 15.4 g of solid urea/glyoxal was recovered. The solid urea/glyoxal component was prepared by Aero-Instant Spray Drying Services of Brunswick, Ga.

The polyacrylamide component employed was HYDROPAM™ produced by Stockhausen, Inc., of Greensboro, N.C. The zirconium oxychloride component employed was obtained from Daftech of Great Neck, N.Y. The ammonium sulfate employed was obtained from American Plant Food Corporation of Galena Park, Tex. The bentonite clay employed was ORGANOTROL® 2200, obtained from Cimbar Performance Minerals of Cartersville, Ga.

For each of the samples listed in Table 1, the components described were first dry blended for 5 minutes in a Kitchen Aide blender using a wire whipping attachment. Thereafter, 350 mL of water was added to each blend. This mixture was allowed to mix for 10 to 15 minutes in a Kitchen Aide blender using a triangular shaped mixing blade. The resulting mixture was poured into a 9 in.×9 in. baking pan and dried for 48 hours at 45° C. Samples were cut from the resulting dried mixture having a size of approximately 6 cm×2 cm×2.5 mm. Each sample was then saturated with water and tested for tensile strength as follows: the test samples were secured in the tensile tester clamp jaws of the tensile strength analyzer, which was configured to pull the sample in a vertical motion thereby applying a tensile force. The tensile strength analyzer was a Mark-10 Test Stand (model ESM) with an Imada (model DS2-11) digital force measurement gauge. The sample was then saturated with deionized water by applying the water in a stream onto the front and back surfaces of the sample with a squirt bottle. Once the sample would no longer absorb water, it was deemed saturated. The sample was then pulled at a rate of approximately 13 mm/minute (about 0.22 mm/sec) and the peak force required to break the sample was measured. 12 measurements were taken per sample number and averaged. The results of these tests are provided in Table 1, below.

TABLE 1

Tensile Strength Analysis

| Sample No. | Fiber Type | | | Guar Gum (g) | Solid Glyoxal (g) | Solid Urea/ Glyoxal (g) | PAM* (g) | Other Additive (g) | Tensile Strength (g/mm$^2$) |
|---|---|---|---|---|---|---|---|---|---|
| | Wood (g) | Paper (g) | Other | | | | | | |
| 1 | 20 | — | — | 1.8 | — | — | 0.2 | — | 1.1 |
| 2 | 18 | — | Flax (2 g) | 1.71 | — | — | — | Zirconium oxychloride (0.09 g) | 1.2 |
| 3 | 18 | — | — | 1.6 | 0.4 | — | — | Ammonium sulfate (0.1 g) | 13.1 |
| 4 | 17 | — | Kenaf (1.0 g) | 1.6 | 0.4 | — | 0.2 | Ammonium sulfate (0.1 g) | 10.7 |
| 5 | 17 | — | PP** microfiber (1.0 g) | 1.6 | 0.4 | — | 0.2 | Ammonium sulfate (0.1 g) | 14.0 |
| 6 | 17 | — | — | 1.6 | — | 0.4 | — | — | 3.9 |
| 7 | 12 | 12.6 | — | 1.71 | — | — | — | Bentonite clay (3.42 g) | 2.28 |
| 8 | 12.1 | 12.6 | — | 1.71 | 0.3 | — | — | Bentonite clay (3.42 g) | 14.3 |
| 9 | 11.3 | 11.7 | — | 2.21 | 0.6 | — | — | Bentonite clay (3.18 g) | 70.3 |

*Polyacrylamide
**Polypropylene

This example shows improved performance of a fiber matrix containing a solid glyoxal or solid glyoxal/urea cross-linking agent. As can be seen in the results listed in Table 1, the samples containing the solid glyoxal cross-linking agent (Sample Nos. 3, 4, 5, 8, and 9) exhibited greatly improved tensile strength compared to the samples containing no solid glyoxal cross-linking agent. Similarly, the sample containing a solid glyoxal/urea cross-linking agent (Sample No. 6) also exhibited improved tensile strength relative to the remaining samples.

Example 2

Accelerated Rain Analysis

Nine samples (Sample Nos. 10-18) were prepared according to the formulations indicated in Table 2, below. The solid glyoxal component for each of these samples was prepared in the same manner described above with respect to Sample Nos. 4 and 5 of Example 1. The suppliers and/or preparation methods for the remaining components in this Example are the same as those described above in Example 1. Sample Nos. 10-18 were prepared in the same manner outlined above in Example 1.

The resulting compositions were spread onto compacted soil placed in a 9 in.×9 in.×2 in. baking pan to simulate a coating rate of 3,500 lbs/acre. The pans were then allowed to dry at room temperature for 48 hours. The test pans were then placed at an angle giving a slope ratio of 3 to 1 and rained on at a rate of 90 to 120 inches per hour. Rain simulation was performed employing a rain testing apparatus that was prepared by drilling holes in a 1×1 inch array in the bottom of a 5 gallon plastic bucket. Plastic pipette tips were inserted into the holes which produced water drops ranging from 2 to 3 mm in diameter. The rain bucket was suspended directly above the test specimen at an elevation of about 10 feet and caused to oscillate approximately 2 inches back and forth by attaching the base of the bucket to a cord which in turn was attached to the head of an oscillating fan. The sample to be tested was placed in a stand at a slope ratio of 3 to 1. The stand was in turn placed in a catch basin containing about 15 gallons of tap water such that the sample was above the level of water in the catch basin. Water was circulated from the catch basin into the suspended bucket using a pump at a rate to maintain a simulated rainfall rate of 90 to 120 inches per hour. The time required to expose the soil at this rain rate is listed in Table 2, below.

TABLE 2

Accelerated Rain Analysis

| Sample No. | Fiber Type | | | Guar Gum (g) | Solid Glyoxal (g) | PAM* (g) | Soil Type | Other Additive (g) | Tap Water (mL) | Soil Exposure Time (m) |
|---|---|---|---|---|---|---|---|---|---|---|
| | Wood (g) | Paper (g) | Other | | | | | | | |
| 10 | 18 | — | — | 1.7 | 0.1 | 0.2 | Potting | — | 400 | 5 |
| 11 | 18 | — | — | 1.6 | 0.2 | 0.2 | Potting | — | 400 | 10 |
| 12 | 18 | — | — | 1.5 | 0.4 | 0.2 | Potting | — | 400 | 30 |
| 13 | 18 | — | — | 1.65 | 0.35 | — | Top soil | — | 400 | 60 |
| 14 | 18 | — | — | 1.49 | 0.32 | — | Top soil | SAP*** (0.2 g) | 400 | 120 |
| 15 | 35.2 | — | PP** microfiber (1.0 g) | 3.3 | 0.7 | — | Top soil | — | 400 | 90 |
| 16 | 35.8 | — | — | 3.3 | 0.7 | — | Top soil | Ammonium sulfate (0.2 g) | 400 | 105 |
| 17 | 12 | 12.6 | — | 1.71 | — | — | Top soil | Bentonite clay (3.42 g) | 300 | 60 |
| 18 | 12.1 | 12.6 | — | 1.71 | 0.3 | — | Top soil | Bentonite clay (3.42 g) | 300 | >120 |

*Polyacrylamide
**Polypropylene
***Super Absorbent Polymer (crosslinked polyacrylamide beads of about 0.5 mm in diameter)

This example shows improved rain resistance in fiber matrices containing increased amounts of a solid glyoxal cross-linking agent. As can be seen in the results listed in Table 2, above, the samples prepared with higher concentrations of the solid glyoxal cross-linking agent (Samples Nos. 12-16 and 18) withstood the simulated rain for much longer periods of time before exposing the underlying soil.

Example 3

Erosion Analysis

A formulation was prepared using 100 pounds of wood fiber, 8.25 pounds of guar gum, and 1.75 pounds of dried glyoxal cross-linking agent, each as described above in Example 1. The solid glyoxal component for this formulation was prepared in the same manner described above with respect to Sample Nos. 4 and 5 of Example 1. A first aqueous mixture (Erosion Sample A) was prepared by diluting a portion of the dry formulation with water at a rate of 50 lbs/100 gal and applied using a Firm Hydroseeder at a rate of 3,500 lbs/acre based on the weight of the dry formulation to a 4 ft.×10 ft. test bed composed of compressed sandy loam top soil. Two additional aqueous mixtures (Erosions Samples B and C) were prepared by dilution respective portions of the dry formulation with water at a rate of 50 lbs/120 gal and applied using a Finn Hydroseeder at a rate of 3,500 lbs/acre based on the weight of the dry formulation to a 4 ft.×10 ft. test bed composed of compressed sandy loam top soil. After 48 hours of drying at room temperature, the beds were tilted to a slope ratio of 2.5 to 1 and rained upon (as described below) at a rate of 5 in./hour. After one hour of collecting water run-off, the rain test was stopped. Calculation of the effectiveness of the fiber matrix in preventing soil erosion indicated Erosion Sample A to be 99.999% effective and Erosion Samples B and C to be 99.9% effective.

This example was performed in the Rainfall Simulation Facility of Utah State University. The rainfall simulator employed is a drip-type device in which raindrops are formed by water emitting from the ends of small diameter brass tubes. The rate of flow was controlled by admitting water into manifold chambers through fixed orifice plates under constant hydraulic pressure. Five separate inlet orifices were used in each chamber or simulator module. The ratios of the areas of the tubing to the orifices were 1, 2, 4, 8, and 16. By controlling the water flow to the orifices with electric solenoid valves and the water pressure with a movable head tank, it was possible to vary rainfall rate from approximately 2 to 25 inches per hour. The underside of each chamber or module was equipped with evenly spaced brass tubes. Each module was a 24-inch square enclosed box about 1-inch deep and oriented so that the ends of the tubes or needles formed a horizontal plane to let the water drip to test plots below. Each module had 576 needles spaced on a 1-inch square grid pattern. The rainfall simulator consists of 100 adjacent modules spaced to form a square rain simulation panel with a surface area of 400 square feet. Each module can be controlled separately. The 500 electrical control switches were manually actuated via a control panel. Raindrop sizes were representative of typical high intensity storms. The spatial distribution of rain was essentially uniform.

The test product was applied over bare soil in a test flume. The square test flume measured approximately 20 feet on each side and could be tilted to a desired angle. The rainfall simulator is supported over the flume so that rain fell directly onto the test plot. Each of the above-described plots contained a 1-foot depth of soil supported by a metal grating covered with a filter cloth through which water can drain.

For the samples prepared as described above, the total runoff, including water, soil, and mulch was collected. In addition, the total runoff was also divided into runoff from the first and second 30-minute test periods for the post runoff test. The purpose for separating the two runoff periods is that sometimes the moisture absorption characteristic of the soil and sediment control product change as they approach a saturated condition and/or as rills form in the soil. Following the test, the total runoff was weighed. After the sediment had settled, the water was filtered off and the sediment dried and weighed. A comparison of the amount of sediment in the runoff, as indicated in Table 3, below, to the amount of soil retained provided the effective rates of erosion control noted above.

TABLE 3

Erosion Control Testing

|  | 0 to 30 Minutes | 30 to 60 Minutes |
|---|---|---|
| EROSION SAMPLE A | | |
| Sediment Runoff (lbs) | 0.00 | 0.16 |
| Water Runoff (lbs) | 14.60 | 62.33 |
| Sediment Runoff Rate (lbs/hour) | 0.00 | 0.32 |
| Water Runoff Rate (lbs/hour) | 29.20 | 124.66 |
| EROSION SAMPLE B | | |
| Sediment Runoff (lbs) | 0.01 | 2.80 |
| Water Runoff (lbs) | 24.19 | 211.14 |
| Sediment Runoff Rate (lbs/hour) | 0.03 | 5.61 |
| Water Runoff Rate (lbs/hour) | 48.37 | 422.27 |

TABLE 3-continued

Erosion Control Testing

|  | 0 to 30 Minutes | 30 to 60 Minutes |
|---|---|---|
| EROSION SAMPLE C | | |
| Sediment Runoff (lbs) | 0.004 | 2.58 |
| Water Runoff (lbs) | 10.55 | 195.41 |
| Sediment Runoff Rate (lbs/hour) | 0.01 | 5.15 |
| Water Runoff Rate (lbs/hour) | 21.09 | 390.83 |

As shown in Table 3, Erosion Sample A prepared above had extraordinarily low sediment runoff. Both of Erosion Samples B and C also presented very low sediment runoff when compared to the weight of approximately 40 cubic feet of soil in the test beds. These tests indicate that the surface treatment compositions prepared as described above exhibit excellent erosion control.

Example 4

Age Stability Comparison: Glyoxal Solution v. Solid Glyoxal

Four samples (Sample Nos. 19-22) were prepared according to the formulations indicated in Table 4, below. The solid glyoxal component for Sample No. 22 was prepared in the same manner described above with respect to Sample Nos. 4 and 5 of Example 1. The suppliers and/or preparation methods for the remaining components in this Example are the same as those described above in Example 1. The 40% glyoxal solution employed was obtained from Sigma Aldrich of St. Louis, Mo.

For Sample Nos. 19-22, all components detailed in Table 4, below, were initially dry blended in the same manner outlined above in Example 1. The resulting mixtures were then placed into individual 500 mL beakers. The samples were then compressed by inserting a smaller beaker into the beaker containing the sample and placing a 1 Kg weight into the smaller beaker. The samples were then placed into an oven and aged for the times indicated in Table 4. After aging, the samples were removed, allowed to cool to room temperature, and, thereafter, 350 mL of water was added to each blend. The resulting mixture was poured into a 9 in.×9 in. baking pan and dried for 48 hours at 45° C. Samples were cut from the resulting dried mixture having a size of approximately 6 cm×2 cm×2.5 mm. Each sample was then saturated with deionized water and tested for tensile strength in the same manner as described in Example 1, above. The results of these tests are provided in Table 4, below.

TABLE 4

Age Stability Comparison: Glyoxal Solution v. Solid Glyoxal

| Sample No. | Wood (g) | Guar Gum (g) | Glyoxal Solution, 40% (g) | Solid Glyoxal (g) | PAM* (g) | Aging Duration | Aging Temperature | Tensile Strength (g/mm$^2$) |
|---|---|---|---|---|---|---|---|---|
| 19 | 18 | 1.6 | 1 | — | 0.2 | 2 weeks | Room | 9.6 |
| 20 | 18 | 1.6 | 1.16 | — | 0.2 | 2 weeks | Room | 8.8 |
| 21 | 18 | 1.6 | 1.16 | — | 0.2 | 2 weeks | 45° C. | 4.9 |
| 22 | 18 | 1.6 | — | 0.35 | — | 8 weeks | 45° C. | 10.3 |

*Polyacrylamide

This example shows increased age stability of samples prepared with a solid glyoxal cross-linking agent compared to a dry blended glyoxal solution. As can be seen from the results listed in Table 4, the sample prepared with the solid glyoxal cross-linking agent (Sample No. 22) exhibited excellent tensile strength even after being subjected to elevated temperatures over an 8-week period. By comparison, the samples prepared using a liquid glyoxal solution (samples 19-21) showed poor retention of tensile strength after only two weeks of aging. This example shows that the solid cross-linker has better performance after heat aging than both room temperature and heat aged samples prepared with glyoxal solution cross-linker.

Example 5

Tensile Strength Comparison: Glyoxal Solution v. Solid Glyoxal

Six samples (Sample Nos. 23-28) were prepared according to the formulations indicated in Table 5, below. The solid glyoxal component for Samples Nos. 24, 25, and 28 was prepared by Great Lakes Toll Services of Spring Lake, Mich., using a commercial pan drying oven. A two step addition process was employed which involved filling 24 in.×30 in. trays to the ½ in. level with 40% glyoxal solution, allowing it to dry for 24 hours at 180° F. Thereafter, an additional ½ inch of 40% glyoxal solution was added, followed by drying for another 24 hours at 240° F. The product was then allowed to cool, removed from the pans and ground to a fine powder using 2.5% calcium stearate as a processing aid. The suppliers and/or preparation methods for the remaining components in this Example are the same as those described above in Examples 1 and 4.

For each of the samples listed in Table 5, the dry components described were first dry blended. Thereafter, 340 mL of water was added to each blend, followed by addition of glyoxal solution in Sample Nos. 23, 25, and 27 only. This mixture was blended in an oscillating blender. Excess fluid from each mixture was drained using a sieve pan. The remaining mixture was then poured into a 9 in.×9 in. baking pan and dried at 45° C. for 24 hours. Samples were cut from the resulting dried mixture having a size of approximately 6 cm×2 cm×2.5 mm. Each sample was then saturated with deionized water and tested for tensile strength in the same manner as described in Example 1, above. The results of these tests are provided in Table 5, below.

TABLE 5

Tensile Strength Comparison: Glyoxal Solution v. Solid Glyoxal

| Sample No. | Wood (g) | Guar Gum (g) | Glyoxal Solution, 40% (g) | Solid Glyoxal (g) | Tensile Strength (g/mm²) |
|---|---|---|---|---|---|
| 23 | 36 | 3.3 | 0.7 | — | 14 |
| 24 | 18 | 1.65 | — | 0.35 | 16.3 |
| 25 | 36 | 3.3 | 1.75 | — | 14.7 |
| 26 | 36 | 3.3 | — | 0.7 | 16.9 |
| 27 | 18 | 1.65 | 0.875 | — | 9.2 |
| 28 | 18 | 1.65 | — | 0.35 | 12.4 |

This example shows increased performance of the solid glyoxal cross-linking agent compared to a solubilized glyoxal cross-linking agent. As can be seen from the results listed in Table 5, above, the use of solid glyoxal in similar quantities as glyoxal in solution provides modest improvements in tensile strength in each comparison (i.e., Sample No. 23 v. 24; v. 26; and 27 v. 28).

Example 6

Tensile Strength Comparison: Water Soluble Polymers

Four samples (Sample Nos. 29-32) were prepared according to the formulations indicated in Table 6, below. The solid glyoxal component for Sample Nos. 30 and 32 was prepared in the same manner described above with respect to Sample Nos. 24, 26, and 28 of Example 5. The suppliers and/or preparation methods for the remaining components in this Example are the same as those described above in Example 1. The soy protein polymer employed in this example was PRO-COTE® 4200, obtained from DuPont, Wilmington, Del.

For each of the samples listed in Table 6, the components described were first dry blended. Thereafter, 400 mL of water was added to each blend. The resulting mixture was poured into a 9 in.×9 in. baking pan and dried at 45° C. for 24 hours. Samples were cut from the resulting dried mixture having a size of approximately 6 cm×2 cm×2.5 mm. Each sample was then saturated with water and tested for tensile strength in the same manner as described in Example 1, above. The results of these tests are provided in Table 6, below.

TABLE 6

Tensile Strength Comparison: Water Soluble Polymers

| Sample No. | Wood (g) | Paper (g) | Solid Glyoxal (g) | PAM* (g) | Soy Protein Polymer (g) | Tensile Strength (g/mm²) |
|---|---|---|---|---|---|---|
| 29 | 13.3 | 5.7 | — | 1.0 | — | 5.2 |
| 30 | 13.3 | 5.7 | 0.17 | 0.83 | — | 6.2 |
| 31 | 12.6 | 5.4 | — | — | 2.0 | 3.0 |
| 32 | 12.6 | 5.4 | 0.35 | — | 1.65 | 5.1 |

*Polyacrylamide

The above example shows that the use of a solid glyoxal cross-linking agent can improve the tensile strength of compositions containing water-soluble polymers other than guar gum. As can be seen from the results listed in Table 6, the samples containing solid glyoxal cross-linking agent (Sample Nos. 30 and 32) exhibited increased tensile strength over the samples prepared without solid glyoxal cross-linking agent (Sample Nos. 29 and 31).

Example 7

Effect of Mixed Dialdehyde Cross-Linking Agent

A sample (Sample No. 33) was prepared according to the formulation indicated in Table 7, below. The wood fiber and guar gum in this Example were the same as those described above in Example 1. The solid mixed dialdehyde was prepared by mixing 30.2 g of a 40% glyoxal solution and 10.2 g of a 50% glutaraldehyde solution and placing the resulting mixture into an aluminum pan (3 in.×6 in.) followed by drying in an oven for 60 hours at 45° C. The resulting solid material was removed from the pan after cooling and ground into a powder using a coffee bean grinder. The glyoxal solution was the same as described above in Example 4. The glutaraldehyde solution was 50% technical grade, purchased from Sigma Aldrich, St. Louis, Mo.

For the sample listed in Table 7, the components described were first dry blended in the manner described above in Example 1. Thereafter, 350 mL of water was added to the blend. The resulting mixture was poured into a 9 in.×9 in. baking pan and dried at 45° C. for 24 hours. Samples were cut from the resulting dried mixture having a size of approximately 6 cm×2 cm×2.5 mm. The sample was then saturated with water and tested for tensile strength in the same manner as described in Example 1, above. The result of this test is provided in Table 7, below.

TABLE 7

Effect of Mixed Dialdehyde Cross-Linking Agent

| Sample No. | Wood (g) | Guar Gum (g) | Solid Mixed Dialdehyde* | Tensile Strength (g/mm²) |
|---|---|---|---|---|
| 33 | 18 | 1.65 | 0.35 | 11.3 |

*70 wt. % glyoxal/30 wt. % glutaraldehyde

This example shows that a solid mixed dialdehyde can also provide a fiber matrix having improved tensile strength. As can be seen in Table 7, a solid mixed glyoxal/glutaraldehyde provided a bonded fiber matrix having a tensile strength of 11.3 g/mm².

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

The present description uses specific numerical values to quantify certain parameters relating to the invention, where the specific numerical values are not expressly part of a numerical range. It should be understood that each specific numerical value provided herein is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits. The narrow range associated with each specific numerical value is the numerical value plus and minus 15 percent of the numerical value, rounded to two significant digits. For example, if the specification describes a specific temperature of 62° F., such a description provides literal support for a broad numerical range of 25° F. to 99° F. (62° F.+/−37° F.), an intermediate numerical range of 43° F. to 81° F. (62° F.+/−19° F.), and a narrow numerical range of 53° F. to 71° F. (62° F.+/−9° F.). These broad, intermediate, and narrow numerical ranges should be applied not only to the specific values, but should also be applied to differences between these specific values. Thus, if the specification describes a first pressure of 110 psia and a second pressure of 48 psia (a difference of 62 psi), the broad, intermediate, and narrow ranges for the pressure difference between these two streams would be 25 to 99 psi, 43 to 81 psi, and 53 to 71 psi, respectively.

Claims Not Limited To Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A surface treatment composition comprising a dry blended mixture that comprises:
    (a) a cross-linking agent in solid form comprising a plurality of residues of a dialdehyde, wherein said cross-linking agent comprises a solids content of at least 50 weight percent;
    (b) a water-soluble polymer capable of covalently bonding with said cross-linking agent, wherein said water-soluble polymer comprises guar gum; and
    (c) a fibrous material.

2. The composition of claim 1, wherein said fibrous material comprises cellulosic fibers and/or synthetic fibers.

3. The composition of claim 1, wherein said fibrous material is selected from the group consisting of wood fiber, paper fiber, straw, corn stover, hemp, flax, kenaf, sorghum, coir, cotton gin generated fiber, opened cotton fabric, and combinations of two or more thereof.

4. The composition of claim 1, wherein said cross-linking agent comprises said residues of a dialdehyde in an amount of at least 10 weight percent based on the entire weight of said cross-linking agent.

5. The composition of claim 1, wherein said cross-linking agent further comprises a free dialdehyde and/or free dialdehyde hydrate, wherein said cross-linking agent comprises said free dialdehyde, said free dialdehyde hydrate, and said residues of a dialdehyde in a combined amount of at least 50 weight percent based on the entire weight of said cross-linking agent.

6. The composition of claim 1, wherein said cross-linking agent comprises a plurality of residues of at least two types of dialdehyde.

7. The composition of claim 1, wherein said dialdehyde is selected from the group consisting of glyoxal, malondialdehyde, succindialdehyde, glutaraldehyde, and mixtures of two or more thereof.

8. The composition of claim 1, wherein said dialdehyde comprises glyoxal.

9. The composition of claim 1, wherein at least a portion of said residues in said cross-linking agent are present in the form of oligomers of said dialdehyde, wherein said oligomers of said dialdehyde have a weight-average molecular weight of at least 80 g/mol.

10. A surface treatment method comprising:
    (a) combining water and a surface treatment composition to thereby form an aqueous surface treatment mixture, wherein said surface treatment composition comprises a dry blended mixture that includes:
        (i) a cross-linking agent in solid form comprising a plurality of residues of a dialdehyde,
        (ii) a water-soluble polymer capable of covalently bonding with said cross-linking agent, wherein said water-soluble polymer comprises guar gum,
        (iii) a fibrous material; and
    (b) applying at least a portion of said aqueous surface treatment mixture to a target area.

11. The method of claim 10, wherein said water is present in an amount in the range of from about 50 to about 200 gallons per 50 pounds of said surface treatment composition.

12. The method of claim 10, wherein said applying of step (b) is performed at a rate in the range of from about 100 to about 5,000 pounds per acre of surface based on the dry weight of said surface treatment composition.

13. The method of claim 10, wherein said applying of step (b) comprises spraying at least a portion of said surface treatment mixture onto said target area.

14. The method of claim 10, wherein said target area is selected from the group consisting of soil surfaces, mined ore piles, mining overburden piles, dry tailings impoundments, and landfill waste.

15. The method of claim 10, wherein said cross-linking agent comprises said residues of a dialdehyde in an amount of at least 10 weight percent based on the entire weight of said cross-linking agent.

16. The method of claim 10, wherein said cross-linking agent further comprises a free dialdehyde and/or free dialdehyde hydrate, wherein said cross-linking agent comprises said free dialdehyde, said free dialdehyde hydrate, and said residues of a dialdehyde in a combined amount of at least 50 weight percent based on the entire weight of said cross-linking agent.

17. A method of making a surface treatment composition, said method comprising:
   (a) heating a mixture comprising water and a dialdehyde to remove at least a portion of said water thereby forming a cross-linking agent in solid form, wherein said cross-linking agent comprises a solids content of at least 50 weight percent;
   (b) dry blending at least a portion of said cross-linking agent with a water-soluble polymer capable of covalently bonding with said cross-linking agent, wherein said water-soluble polymer comprises guar gum; and
   (c) blending a fibrous material with said cross-linking agent and said water-soluble polymer, wherein said fibrous material is blended before, after, or simultaneously with said water-soluble polymer.

18. The method of claim 17, wherein said heating is performed at a temperature of at least 30° C., wherein said heating of step (a) removes at least 50 weight percent of said water from said mixture.

19. The method of claim 17, wherein said mixture has a concentration of said dialdehyde of at least 10 weight percent.

20. The method of claim 17, wherein said cross-linking agent comprises a plurality of residues of said dialdehyde.

21. The method of claim 17, wherein said cross-linking agent further comprises a free dialdehyde and/or free dialdehyde hydrate, wherein said cross-linking agent comprises said free dialdehyde, said free dialdehyde hydrate, and said residues of a dialdehyde in a combined amount of at least 50 weight percent based on the entire weight of said cross-linking agent.

22. The method of claim 17, wherein said blending forms said surface treatment composition, wherein said surface treatment composition comprises a total solids content of at least 75 weight percent based on the entire weight of said surface treatment composition.

* * * * *